United States Patent [19]

Joubert

[11] Patent Number: 4,664,838

[45] Date of Patent: May 12, 1987

[54] RAPIDLY HEXAHYDRATED SODIUM TRIPOLYPHOSPHATE DETERGENT COMPOSITIONS

[75] Inventor: Daniel Joubert, Trevoux, France

[73] Assignee: Rhone-Poulenc Chimie de Base, Courbevoie, France

[21] Appl. No.: 787,046

[22] Filed: Oct. 15, 1985

[30] Foreign Application Priority Data

Oct. 15, 1984 [FR] France ................................ 84 15743

[51] Int. Cl.$^4$ ............................................. C11D 17/00
[52] U.S. Cl. ................................ 252/135; 252/174.21; 252/DIG. 14; 423/315
[58] Field of Search ...................... 252/99, 135, 174.21, 252/174.22, DIG. 14; 423/315

[56] References Cited

U.S. PATENT DOCUMENTS

| | | | |
|---|---|---|---|
| 3,356,447 | 12/1967 | Tafler ................................... | 423/315 |
| 3,397,947 | 8/1968 | Shaver ................................. | 423/315 |
| 4,326,979 | 4/1982 | Bus et al. ............................ | 252/158 |
| 4,511,487 | 4/1985 | Pruhs et al. ......................... | 252/99 |

FOREIGN PATENT DOCUMENTS 1089246 11/1967 United Kingdom .

*Primary Examiner*—Lieberman Paul
*Assistant Examiner*—Hoa Van Le
*Attorney, Agent, or Firm*—Burns, Doane, Swecker & Mathis

[57] ABSTRACT

Na tripolyphosphate compositions very rapidly hexahydrated, e.g., in water, and well suited for detergency applications, are comprised of a mass of sodium tripolyphosphate particulates prehydrated with a plurality of hexahydrated sodium tripolyphosphate crystals homogeneously distributed therethrough, (i) said particulates displaying a ratio of phase I crystalline form content to the total content of the phase I plus phase II crystalline forms of at least 50%, (ii) a homogeneous distribution of phase I crystalline form throughout both said particulates and said mass, (iii) a particle size distribution such that the average Rosen-Rambler-Bennett particle diameter ranges from 130 to 250$\mu$, with the maximum amount by weight of particles larger than 630$\mu$ in diameter being about 5% and the maximum amount by weight of particles smaller than 25$\mu$ in diameter being about 20%, (iv) a content in water ranging from about 0.4 to 4% by weight, said water content essentially consisting of the bound water constituting said hexahydrated sodium tripolyphosphate crystals, and (v) with each crystal population of particle sizes being homogeneously distributed throughout said mass.

15 Claims, No Drawings

RAPIDLY HEXAHYDRATED SODIUM TRIPOLYPHOSPHATE DETERGENT COMPOSITIONS

BACKGROUND OF THE INVENTION

1. Field of the Invention:

The present invention relates to a novel sodium tripolyphosphate (TPP) having a high speed of hydration, a process for the preparation thereof and its use in detergency applications, for the preparation of compositions or formulations for washing clothes, particularly liquid formulations.

2. Description of the Prior Art:

The typical preparation of detergents is known to this art to begin with an anhydrous TPP, which is converted to hexahydrated TPP in an aqueous detergent medium containing the other constituents of the detergent.

The paste or suspension thus obtained may itself be a liquid detergent, or it may be spray-dried to form a detergent powder.

Considering these methods of preparation, it will be appreciated that the desired TPP must be one which can be hydrated as quickly and as quantitatively as possible. It is also necessary to obtain pastes of low enough viscosity to enable them to be pumped or sprayed under industrial conditions.

It too is known that anhydrous TPP can be obtained in different crystalline forms, phase I or phase II, which behave differently on hydration. Thus, phase I is hydrated very quickly but tends to give rise to solidification and curdling which creates problems in industrial use. Phase II on the other hand gives homogenous pastes, but speed of hydration thereof is unfortunately too slow.

Many processes have been proposed for preparing grades of TPP which specifically have a good hydration speed. In particular, the process described in published European Patent Application No. 101,347 is known. In this process, a TPP is prepared by introducing an orthophosphate solution into a reactor, in which the solution is dispersed in the vortex of a downwardly helically following gaseous phase. The TPP thus obtained has good properties, but it requires specific equipment which is different from that normally used in the TPP industry. Furthermore, there is a demand for a TPP with a still higher speed of hydration and with paste viscosities still lower than those obtained with this product.

SUMMARY OF THE INVENTION

Accordingly, a major object of the present invention is the provision of an improved TPP which can be prepared with conventional equipment and which combines to the maximum the advantages of phase I, i.e., a high speed of hydration, with those of phase II, namely, obtaining homogenous low viscosity pastes, without having the disadvantages of these respective phases.

Briefly, the TPP according to the invention has the aforesaid required properties and is characterized by the following attributes:

(i) a phase I content of at least 50%;

(ii) homogenous distribution of phase I;

(iii) a particle size distribution with the average RRB diameter from 130 to 250$\mu$ and with the maximum proportions by weight of product with particles larger than 630$\mu$ and smaller than 25$\mu$ in diameter, of about 5% and about 20%, respectively;

(iv) a water content of from 0.4 to 4%, the water being present essentially in the form of crystals of hexahydrated sodium tripolyphosphate; and (v) homogeneous distribution of said crystals within each separate particle size range of the product.

DETAILED DESCRIPTION OF THE INVENTION

More particularly according to the present invention, the TPP as defined above has very interesting physico-chemical properties, especially for the preparation of detergent pastes or slurries for spraying or for the preparation of easily poured liquid detergent compositions, containing TPP in hexahydrated form and in the microcrystalline suspension state.

The TPP of the invention is facilely prepared by a process comprising the following stages:

(a) starting with a tripolyphosphate resulting from a single polycondensation step and at a temperature such that a phase I content of at least 50% is obtained;

(b) carrying out coarse primary grinding of the tripolyphosphate;

(c) prehydrating the ground tripolyphosphate by spraying an aqueous suspension of hexahydrated tripolyphosphate onto same, to adjust the water content of the prehydrated tripolyphosphate to form about 0.4 to about 4%;

(d) carrying out secondary grinding of the prehydrated tripolyphosphate to obtain a particle size distribution such that the average RRB diameter is from 130 to 250$\mu$, and such that the maximum proportions of product with particles larger than 630$\mu$ in diameter and with particles less than 25$\mu$ in diameter are about 5% and about 20%, respectively.

The TPP of the invention attributes its special properties to a group of characteristics which will be described in greater detail below.

Firstly, the TPP of the invention has a phase I content defined by the ratio, Phase I/Phase I+Phase II, of at least 50%. The products within the ambit of the invention generally have a phase I content of at least 70%.

Another important characteristic of the sodium tripolyphosphates according to the invention resides in the homogenous distribution of the phase I. This means that each grain of TPP contains the same amount of phase I as the entire product. In other words, there is never a TPP mixture containing different amounts of phase I. It also means that the TPP of the invention results from a single polycondensation step at a temperature designed to give the desired content of phase I. Examples of such TPP's are those obtained by polycondensation in a single oven, e.g., of revolving drum type. Insofar as the preparation of the sodium tripolyphosphates is concerned, it should be noted that those which can be used according to the invention are those resulting from polycondensation in an oven, and that those obtained by spraying are not suitable.

The particle size distribution is also an important characteristic of the TPP according to the invention. It must be such that the average RRB (Rosin-Ramler-Benett) diameter is from about 130$\mu$ to 250$\mu$. In addition, the particles larger than 630$\mu$ in diameter must constitute no more than about 5% by weight of the product, and those smaller than 20$\mu$ in diameter no more than about 20% by weight. It is preferable for these maxima to be 2.5% for the particles larger than 630μ and 10% for those smaller than 20μ.

Generally, the average diameter is coarser and there is a wider spread of particle sizes than in TPP's for slurry and liquid compositions normally available on the open market.

This wide spread of particle sizes contributes to the rapid dissolution of TPP without solidification, and to rapid recrystallization without nodule or aggregate formation, leading to a slurry of satisfactory viscosity.

Another essential characteristic is that the TPP of the invention is prehydrated. Insofar as the prehydration is concerned, three points must be taken into account.

Firstly, the water content of the prehydrated TPP is from about 0.4 to about 4% by weight and is preferably at least 1.7%, this amount of water being measured by weight loss at 550° C.

Secondly, the water is present essentially completely in the form of hexahydrated TPP.

This characteristic is obtained by spraying an aqueous suspension of hexahydrated TPP onto the anhydrous TPP under conditions which will be described later. The TPP thus treated will contain crystals of hexahydrate.

Finally, the hexahydrate. crystals are distributed homogenously throughout the TPP of the invention. In other words, each population of particle sizes contains the same proportion of hexahydrate crystals. This can be measured by the loss of water at 550° C., which must be substantially identical regardless of the particle size range considered. It also means that the loss of water for each range of particle sizes is of the same order of magnitude as that determined for the entire product.

To illustrate this characteristic, the losses of water for different particle size ranges of TPP in accordance and not in accordance with the invention are given below. The test numbers given in the tables refer to the examples which will be given later.

| Range of particle sizes mm | TPP according to invention, % loss at 550° C. Test No. 6 | Prior art TPP % loss at 550° C. |
| --- | --- | --- |
| 0–025 | 3.21 | 3.18 |
| 0.025–0.050 | 3.21 | 2.97 |
| 0.050–0.100 | 3.59 | 2.72 |
| 0.100–0.160 | 3.82 | 2.56 |
| 0.160–0.200 | 4.39 | 3.35 |
| 0.200–0.250 | 4.45 | 6.72 |
| 0.250–0.315 | 4.03 | 9.13 |
| 0.315–0.400 | 3.64 | 10.14 |
| 0.400 | 2.92 | 13.78 |
| Loss in entire product at 550° C. | 3.44% | 4.43% |

| Range of particle sizes mm | TPP according to invention, Loss at 550° C. Test No. 11 |
| --- | --- |
| 0–0.050 | 2.1% |
| >0.630 | 2.48% |
| Entire product | 2.20% |

The hexahydrate nuclei thus present on the TPP of the invention will also be favorable to recrystallization of the product, and particularly to the speed at which crystals appear during the subsequent preparation of slurries.

As regards the other features of the TPP according to the invention, it should be noted that the level of purification to be attained is not critical. Thus, products with a residual content of calcium and magnesium ions of up to about 300 ppm per cation are adequate. This is an added advantage of the product of the invention from an economic point of view.

It should also be noted that the TPP of the invention will preferably have a "true" TPP content, that is to say, excluding the other phosphated forms, of at least 93%.

Finally, the TPP Of the invention has an apparent density of at least 0.8 and preferably from 0.9 to 1.2. TPP's with a lower apparent density are not suitable, particularly those obtained by spraying.

The method of preparing the TPP according to the invention will now be described more completely.

As stated above, the starting material is a TPP resulting from a single polycondensing step, at a temperature designed such that the TPP contain at least 50% of phase I.

Primary coarse grinding of the TPP Is then carried out by any known means.

The primary grinding is generally carried out such as to provide a product with an average RRB diameter from 600μ to 1500μ, more particularly from 600μ to 800μ, the particles larger than 1 mm in diameter constituting not more than 20 to 40% by weight of the product, those larger than 2 mm in diameter not more than 5 to 15% by weight and those smaller than 100μ in diameter not more than 5 to 20% by weight.

The ground TPP is then prehydrated by spraying an aqueous suspension of hexahydrated TPP onto same.

The suspension is prepared by adding sufficient TPP to water as to supersaturate it. The prepared suspension preferably has a TPP content of 30 to 35% TPP. In preparing the suspension it is preferably to use a TPP which has the same feature of homogenous distribution of phase I as that described above in connection with the TPP of the invention.

Its phase I content must also be at least 50%.

Spraying is carried out by any suitable means. The quantity of suspension sprayed is generally from 0.6 to 6% by weight relative to the anhydrous TPP.

After the spraying operation, the prehydrated TPP is subjected to a secondary grinding such as to give it the particle size distribution of the final product, defined above by the average RRB diameter and the maximum residues. It is this secondary grinding that is responsible for the homogenous distribution of hexahydrated TPP crystals within each separate size range of the population of particle sizes.

The TPP thus produced may be used in a manner known per se and with all the other "normal" compounds which are known in the preparation of spraying slurries or pastes for the manufacture of washing powders.

The TPP of the invention has a number of advantages in the preparation of these slurries, which are apparent in the various properties given below:

(1) The kinetics of conversion of anhydrous TPP to hexahydrated TPP. Under the test conditions, which will be defined later, the conversion speed ranges from 8 to 10 minutes versus the normal speed of 20 to 50 minutes for known products.

(2) The conversion rates from anhydrous to hexahydated TPP at a constant time or at the conversion stage. These rates are higher for the products of the invention, at least 98% versus 95 to 60% for ordinary TPP's.

(3) The consistency of the slurry. Its viscosity is lower with the TPP of the invention.

(4) The rheological properties of the slurry when pumped out of the blending reactor. These properties are also improved: 6 to 8 poises under a speed gradient of 300 sec$^{-1}$ at 80° C. versus 8 to 15 poises for ordinary prior art TPP's.

(5) The rheological properties of the slurry during colloidal grinding. A drop of 8 to 2 poises is observed versus a drop of 6 to 3 poises with normal TPP's.

(6) The rheological properties of the slurry when atomized in a spraying tower. The viscosity is from 12 to 14 poises under $1.5.10^5$ sec $^{-1}$ versus 14 to 20 poises for ordinary TPP's.

Property (1) permits high working rates (continuous preparation of slurry) under good conditions. Properties (3) to (6) also make it possible to work under good conditions with the dry extract from the slurry 2 to 5% higher. Property (2), in combination with properties (3) to (6), make it possible to obtain, after drying, a minimum rate of reversion or hydrolysis of the TPP of 5 to 10% of pyrophosphate relative to the TPP included in the composition.

Apart from the use just described, for the preparation of spraying slurries, the TPP Of the invention may be used in the manufacture of liquid detergents based on hexahydrated TPP maintained in micro-crystalline suspension.

In this application the TPP of the invention gives a stable liquid composition without any threshold of flow, which may contain up to 30% of TPP, based on the anhydrous form, versus 20 to 25% with normal commercial TPP's.

Liquid compositions based on a TPP of the type according to the invention may contain up to 20 to 25% of surfactant.

Liquid compositions may be prepared by the preferred method described below.

In a first stage, a TPP according to the invention is mixed with water to form a suspension of hexahydrated TPP. It should be noted that this suspension may advantageously be formulated in an aqueous alcoholic medium, starting with a mixture of water, alcohol or polyol. In this case, the proportion of crystallized TPP relative to dissolved TPP is improved.

In a second stage, a concentrated preparation of active ingredients is added to the suspension thus prepared. The active ingrédients referred to here are any known constituents compatible with the corresponding formulation and adapted to give it improved or important properties, such as surfactants, sequestering agents, whitening agents, anti-redeposition agents, optical brighteners, biological additives, hydrotropes, solvents and foam inhibitors.

In order to further illustrate the present invention and the advantages thereof, the following specific examples are given, it being understood that same are intended only as illustrative and in nowise limitative.

Said examples also illustrate the behavior of the TPP according to the invention in a slurry and its behavior in the preparation of liquid detergent formulations.

[A]—EXAMPLE 1

Behavior in a Slurry:
Apparatus:
The apparatus described below simulated the operations of mixing, followed by pumping and finally spraying, that a detergent slurry is subjected to. These operations can be divided into two principal categories; firstly, the mixing of the constituents and hydration and recrystallization of the TPP, and, secondly, the handling of the finished slurry and its pumping and spraying.

Insofar as the first category is concerned, a reactor or "crutcher" with a double jacket was used to prepare the slurry. The jacket may have a heating fluid running through it or it may be emptied of its contents and operated as an insulated double wall.

The reactor was fitted with a helical agitator complemented by four opposing blades fixed on the reactor. Agitation was produced by a variable speed DC motor. A servomotor associated with a tachometer maintained the speed constant however strong the resistant torque was.

As regards the second category, there was a pump connected to a valve at the bottom of the reactor and discharging into a calibrated stainless steel tube 100.9 mm long and 14 mm in diameter. A flow meter was placed at the inlet of the tube and two pressure sensors were arranged, one at each end, to record the loss of pressure. A return pipe R connected the tube to the reactor.

There were, in addition, two tubes or capillaries $C_1$ and $C_2$ which were 2 and 4 mm long, respectively, and 2 mm in diameter and which were mounted in parallel with the return pipe and connected to the tube.

The prepared slurry could therefore be extracted through the bottom of the reactor, discharged by the pump into the calibrated tube and recycled into the crutcher by the return pipe R or one of the capillaries $C_1$ and $C_2$.

Measurements:
1st Category:
The measuring and recording system gave the following data within the range of the reactor: temperature of heating liquid in double jacket, temperature of material in reactor, level of resistant torque on agitator motor.

The value of the entire apparatus in water and the corresponding heat losses were evaluated by calibration.

The following information was deduced from these readings:

Calorimetry: The corrected curve giving the liberation of heat due to hydration/recrystallization was plotted. This gives the kinetics or hydration (slope of the curve), total time of hydration (time to arrive at plateau), rate of hydration (by comparison with the quantity of Kcal which can theoretically be liberated as a function of the detailed weight analysis of the TPP tested). The rate of hydration and recrystallization of the TPP at a given constant mixing time, e.g., after 12 minutes, corresponding to the average time of an industrial operation, was also ascertained.

Consistency of Medium: A first evaluation of the consistency of the medium was obtained by recording the amperage consumed by the constant speed electric motor.

The amperage consumed for a constant time of 12 minutes may also be recorded.

2nd Category:
In this second category, the measurements for differential pressure, temperature and flow rate of slurry enable the rheological properties of the suspension to be ascertained. The slurry was pumped through the calibrated tube at a varying flow rate. The measurements taken at the tube reflects the slurry behaved when it was pumped out of the reactor.

The slurry was then transferred into capillaries $C_1$ and $C_2$. Measurements taken at the first, taking into account the dimensions and flow rates, gave indications about the behavior of the slurry in a colloidal grinder; measurements taken at the second provided information about the behavior of the same slurry when sprayed.

Each time the slurry passed over the capillaries $C_1$ and $C_2$ its viscosity was remeasured with the aid of the calibrated tube.

Composition and Preparation of Slurry:
The composition of the slurry was as follows
(i) Sodium sulfonate DDB: 9.0%
(ii) Sodium stearate: 1.5%
(iii) Sodium silicate: 2.5%
(iv) Sodium sulfate: 11.0%
(v) TPP: 31.0%
(vi) Water: 45.0%
The preparation was as follows:
The sulfonic acid and stearic acid were mixed in the reactor
(1) sulfonic acid: 1348 g
(2) stearic acid: 223 g
The mixture was heated to about 50°–55° C. (stearic acid melts) then
(3) water: 1000 g
was added. The acids were neutralized cold (at about 40° C.) using a sodium hydroxide solution.
(4) NaOH pellets: 210 g
(5) Water: 1500 g
After neutralization
Water: 2000 g
was added, then the temperature of the mix was adjusted to about 60° C. before a sodium disilicate solution was added.
(6) Sodium disilicate: 800 g
(7) Water: 1000 g
followed by
(8) Water: 1200 g (rinsing water).
When the temperature of the reactor reached 70° C.
(9) Sodium sulfate: 1760 g
was added. The temperature of the mix was then adjusted to 80° C. and the reactor maintained at that temperature for 15 minutes.
Before the addition of
(10) TPP: 4960 g
the control of the reactor was stopped, namely, the heating liquid was no longer circulated in the double jacket of the reactor. The agitating speed of the reactor was gradually increased to 280 rpm during the introduction of the TPP, which required only 15 to 40 seconds. The reactor was maintained at that speed for 2 minutes, then reduced to 200 rpm, and this speed was maintained constant throughout the hydration reaction. As soon as the TPP was introduced, two features were recorded: firstly, development of the agitating force (torque) and, secondly, an increase in the reactor temperature (the hydrating reaction was exothermic).

Results:
The operations described above were carried out using several TPP's. The results are summarized in Tables I and II below.

In line 6 of Table I, "no" indicates that the material was prehydrated with water and not with an aqueous suspension of TPP.

In Table II the rate of hydration in line 2 was calculated at the plateau of the heat curve. The consistency of the medium in line 4 is that at the plateau of the heat curve.

Finally, lines 6-2 and 6-3 correspond respectively to measurements taken at the calibrated tube after passage through capillary $C_1$ and measurements taken at capillary $C_2$ for speed gradients $\Gamma$ indicated in the Table.

Tests 1, 6 and 11 correspond to TPP's according to the invention.

Tests 2 and 3 were carried out with products which were not subjected to prehydration according to the invention, that is to say, with an aqueous suspension of TPP. Nor do these products have the homogenous distribution of hexahydrate crystals characteristic of the products according to the invention. In both cases the hydrating speeds were slower and the hydration rates inadequate. The slurry in the reactor was more viscous.

Tests 4, 5 and 7 concern products which had the same differences from the invention as the products of tests 2 and 3, plus an absence of phase I homogeneity and, in the case of tests 5 and 7, insufficient particle size distribution. The hydration speeds and rates were inadequate, and the rheological properties of the slurry were poorer than in the products of the invention.

The product of test 8 did not have a suitable particle size distribution. Despite its small content of phase I and its high degree of cation purity, it had a long hydration time. The product of test 9 was completely unsatisfactory. It was not prehydrated.

The product of test 10 was obtained by the method of European Application No. 101,347. It provided a slurry having a higher consistency. It should also be noted that after the colloidal grinding the viscosity of the medium was much higher than in the products of the invention.

[B]—EXAMPLE 2

Behavior in the Preparation of Liquid Detergent Formulations:

Apparatus:
A cylindrical 1 liter glass reactor was used, equipped with opposing blades and an agitator with a vertical axis. A detergent formulation of the type described above was prepared therein.

The apparatus was equipped with a temperature probe connected to a recorder, and the motor driving the agitator was a constant speed DC motor which was controlled automatically.

With a motor of this type, the strength of current consumed could be measured and recorded.

The variation obtained was proportional to the consistency of the medium. The dissolution and recrystallization of the anhydrous TPP to TPP.6H$_2$O could therefore be followed in parallel with the development of the temperature.

Mode of operation:
A mixture having the following composition was used:
(i) De-ionized water: 45%
(ii) Glycerol: 10%
(iii) Anhydrous TPP: 45%

The operation was commenced at room temperature by placing first the water, then the glycerol and finally the TPP in the reactor. Agitation was maintained for 20 minutes after the introduction of TPP.

Measurements and results:
The amperage consumed in agitating the mix at a constant speed of 300 rpm was noted after 10 minutes and 20 minutes of mixing.

Upon completion of the operation, the appearance of the obtained mix was observed: the presence or absence of curdling, its stability and possible solidification of the entire mass of material; these were the parameters which will vary with the type of TPP used.

The results are reported in Tables III and IV.

Tests 12 and 15 were carried out with products according to the invention, the same as in tests 1 and 6, while tests 13 and 14 were carried out with the same products as tests 3 and 4.

Test 16 was conducted with a product of unsuitable particle size distribution. The same applied to tests 17 to 20, where the products were also without homogenous distribution of the hexahydrate crystals Test 21 was carried out with the product of test 10 and gave rise to a very thick suspension.

[C]—EXAMPLE 3

This example illustrates a type of liquid detergent composition which can be utilized with a TPP according to the invention. The quantities given are % by weight:

(i) Water: 27.4
(ii) Glycerol (polyol): 5
(iii) TPP: 28
(iv) $C_{12}$ alkylbenzene sulfonate (50% in water): 32
(v) $C_{12}$60E alcohol: 4
(vi) Silicone emulsion: 0.4
(vii) Hydrotrope (toluene sulfonate): 1.0
(viii) Alcohol (isopropanol): 2
(ix) Bluing agents: 0.2

TABLE I

| TESTS Properties of Products | 1 | 2 | 3 | 4 | 5 | 6 | 7 | 8 | 9 | 10 | 11 |
|---|---|---|---|---|---|---|---|---|---|---|---|
| 1. Content of true TTP | 95 | 94 | 93 | 94 | 93 | 93 | 95 | 96 | 93 | 93 | 93 |
| 2. Apparent density | 0.90 | 0.95 | 0.95 | 0.95 | 1.00 | 0.95 | 0.95 | 0.88 | 0.92 | 0.45 | 0.90 |
| 3. Content of phase I | 70 | 50 | <5 | 50 | 30 | 70 | 20 | <5 | 70 | 87 | 90 |
| 4. Homogeneous distribution of phase I | yes | yes | yes | no | no | yes | no | yes | yes | yes | yes |
| 5. Particle size distribution | | | | | | | | | | | |
| Average ∅ (Rosin-Ramler-Benett) | 180μ | 150μ | 160μ | 170μ | 65μ | 130μ | 90μ | 110μ | 85μ | 210μ | 150μ |
| % by weight of particles > 630μ | 2.4 | 2.0 | 3.0 | 3.0 | 0 | 1.5 | 0.5 | 1 | 0.5 | 0.5 | 1.5 |
| % by weight of particles > 25μ | 5.0 | 5.0 | 10.0 | 7.0 | 25.0 | 8 | 2.5 | 0 | 5 | 1 | 8 |
| 6. Prehydration with aqueous suspension of TPP | yes | no | no | no | no | yes | no | no | no | no | yes |
| Quantity of water (% $H_2O$ through weight loss of 550° C.) | 1.70 | 1.95 | 2.04 | 1.90 | 1.82 | 3.8 | 4.0 | 1.1 | 0.2 | 1.5 | 2.20 |
| 7. Homogeneous distribution of hexahydrate crystals within each particle size population | yes | no | no | no | no | yes | no | yes | * | no | yes |
| 8. Purity (foreign cations) | | | | | | | | | | | |
| $CA^{++}$ ppm | 300 | 290 | 280 | 290 | 300 | 300 | 55 | 60 | 360 | 150 | 250 |
| $mg^{++}$ ppm | 290 | 250 | 250 | 270 | 270 | 180 | 15 | 20 | 200 | 30 | 150 |

*Product was not prehydrated

TABLE II

| | Behavior in Spray Slurry | | | | | | | | | | |
|---|---|---|---|---|---|---|---|---|---|---|---|
| TESTS Properties of Products | 1 | 2 | 3 | 4 | 5 | 6 | 7 | 8 | 9 | 10 | 11 |
| 1. Hydration time (TTPA→TPP .6$H_2O$) min | 9 | 24 | 108 | 36 | 55 | 12 | 18 | 33 | 67 | 13 | 99 |
| 2. Hydration rate | 98.5 | 92.5 | 63.7 | 79.8 | 75 | 96 | 90 | 90 | 88 | 100 | 99 |
| 3. Hydration rate at t = constant = 12 mins | 98.5 | 79 | 10.5 | 57.0 | 56 | 96 | 87 | 68 | 60 | 83 | 99 |
| 4. Consistency of medium (amperage) | 5.8 A | 6.6 A | 9.4 A | 7.5 A | 9.5 A | 6.0 A | 7.5 A | 10.2 A | — | 7.4 | 7 |
| 5. Consistancy of medium at t = constant = 12 mins | 6 A | 4.6 A | 4.4 A | 4.9 A | 7.0 A | 6.0 A | 7.0 A | 8.0 | 8 A | 7.4 | — |
| 6. Rheological properties on pumping | | | | | | | | | | | |
| 6.1 Viscosity "leaving crutcher" under Γ = 300 sec$^{-1}$ | 7.2 p | 6.4 p | 27 p | 7.8 p | 10 p | 8.0 p | 7.2 p | 7.2 p | | 7.0 | 7.8 |
| 6.2 Viscosity after colloidal grinding under Γ = 300 sec$^{-1}$ | 2.6 p | 2.5 p | 10 p | 5.8 p | 8.5 p | 4.7 p | 3.1 p | 3.5 p | * | 4.8 | 2.5 |
| 6.3 Viscosity at base, high gradient Γ = 0.5 = 2.10$^3$ sec$^{-1}$ | 8.8 p | 9 p | 10 p | 10 p | 10 p. | 8.2 p | 9.0 p | 17.0 p | | 10.4 | 8.9 |

*Pumpability zero, rheological measurements impossible

TABLE III

| | Properties of Products | | | | | | | | | |
|---|---|---|---|---|---|---|---|---|---|---|
| | 12 | 13 | 14 | 15 | 16 | 17 | 18 | 19 | 20 | 21 |
| 1. Content of TPP | Product of test 1 (see Table I) | Product of test 3 (see Table I) | Product of test 4 (see Table I) | Product of test 6 (see Table I) | 93 | 93 | 94 | 93 | 93 | Product of test 10 (see Table I) |
| 2. Apparent density | | | | | 0.90 | 0.92 | 0.90 | 0.92 | 0.93 | |
| 3. Content of phase I | | | | | 70 | 70 | <5 | 70 | 70 | |
| 4. Homogeneous distribution of phase I | | | | | yes | yes | yes | yes | yes | |
| 5. Particle size distribution | | | | | | | | | | |
| Average ∅(Rosin-Ramler-Benett) | | | | | 60μ | 115μ | 100μ | 130μ | 100μ | |

TABLE III-continued

| | Properties of Products | | | | | | | | | |
|---|---|---|---|---|---|---|---|---|---|---|
| | 12 | 13 | 14 | 15 | 16 | 17 | 18 | 19 | 20 | 21 |
| % by weight of particles > 630μ | | | | | 0% | 0.5% | 0.5% | 8% | 0.5% | |
| % by weight, particles < 25μ | | | | | 15% | 5% | 6% | 5% | 5% | |
| 6. Prehydration with aqueous suspension of TPP | | | | | yes | yes | no | no | no | |
| Quantity of water (% $H_2O$ through weight loss at 550° C.) | | | | | 3.8 | 4.6 | 2.1 | 4.4 | 4.5 | |
| 7. Homogeneous distribution of hexahydrate crystals within each particle size population | | | | | yes | no | no | no | no | |
| 8. Purity (foreign cations) | | | | | | | | | | |
| $CA^{++}$ ppm | | | | | 300 | 300 | 100 | 300 | 300 | |
| $Mg^{++}$ ppm | | | | | 180 | 150 | 50 | 150 | 150 | |

TABLE IV

| | Behavior in preparation of liquid formulations | | | | | | | | | |
|---|---|---|---|---|---|---|---|---|---|---|
| TESTS | 12 | 13 | 14 | 15 | 16 | 17 | 18 | 19 | 20 | 21 |
| 1. Amperage consumed by agitator during mixing | | | | | | | | | | |
| at t = 10 mins | 0.25 | Solidified | Solidified | 0.25 | 0.75 | 0.75 | Solidified | 0.50 | 1.10 | 1.90 |
| at t = 20 mins | 0.25 | | | 0.25 | 0.80 | 1.05 | | 0.70 | 1.45 | 2.30 |
| 2. Appearance of suspension | | | | | | | | | | |
| Fluid, without curdling | X | — | — | X | X | X | | | | |
| Fluid, with curdling | — | — | — | — | — | | | | | |
| Very thick | — | — | — | — | — | | | X | X | |
| Solidified | no | X | X | no | no | | X | | | |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising a rapidly hydrated mass of polycondensed sodium tripolyphosphate particulates prehydrated with a plurality of hexahydrated sodium tripolyphosphate crystals homogeneously distributed therethrough, (i) said particulates displaying a ratio of phase I crystalline form content to the total content of the phase I plus phase II crystalline forms of at least 50%, (ii) a homogeneous distribution of phase I crystalline form throughout both said particulates and said mass, (iii) a particle size distribution such that the average Rosen-Rambler-Bennett particle diameter ranges from 130 to 250μ, with the maximum amount by weight of particles larger than 630μ in diameter being about 5% and the maximum amount by weight of particles smaller than 25μ in diameter being about 20%, (iv) a content in water ranging from about 0.4 to 4% by weight, said water content essentially consisting of the bound water constituting said hexahydrated sodium tripolyphosphate crystals, and (v) with each crystal population of particle sizes being homogeneously distributed throughout said mass.

2. The composition of matter as defined by claim 1, said ratio (i) of phase I crystalline form content being at least 70%.

3. The composition of matter as defined by claim 1, wherein the particle size distribution (iii) is such that the maximum amount by weight of particles larger than 630μ in diameter is about 2.5% and the maximum amount by weight of particles smaller than 25μ in diameter is about 10%.

4. The composition of matter as defined by claim 1, said tripolyphosphate particulates having an apparent density of at least 0.8.

5. The composition of matter as defined by claim 4, said tripolyphosphate particulates having an apparent density ranging from about 0.9 to 1.2.

6. The composition of matter as defined by claim 4, said tripolyphosphate particulates comprising at least 93% true tripolyphosphate.

7. A process for the preparation of the composition of matter as defined by claim 1, comprising (a) coarsely grinding a singly polycondensed, anhydrous sodium tripolyphosphate having a phase I crystalline form content of at least 50%, (b) prehydrating said ground tripolyphosphate and adjusting the water content thereof to from about 0.4 to about 4% by weight, by spraying thereon an aqueous suspension of hexahydrated sodium tripolyphosphate, and (c) thence secondarily grinding said prehydrated tripolyphosphate to effect said particle size distribution (iii).

8. The process as defined by claim 7, said coarse grinding (a) being such as to provide an average Rosen-Rambler-Bennett particle diameter of from 600 to 1500μ, with not more than 40% by weight of the particles having a diameter greater than 1 mm, not more than 15% by weight of the particles having a diameter greater than 2 mm, and not more than 20% by weight of the particles having a diameter smaller than 100μ.

9. The process as defined by claim 8, said spray of aqueous suspension of hexahydrated sodium tripolyphosphate comprising from 0.6 to 6% by weight of the anhydrous sodium tripolyphosphate.

10. A liquid detergent composition comprising the composition of matter as defined by claim 1 in hexahydrated state.

11. The liquid detergent composition as defined by claim 10, comprising an aqueous detergent medium.

12. The liquid detergent composition as defined by claim 11, comprising an aqueous paste, slurry or suspension.

13. The liquid detergent composition as defined by claim 11, comprising a detergency surfactant.

14. The liquid detergent composition as defined by claim 13, further comprising an alcohol or polyol medium.

15. The liquid detergent composition as defined by claim 13, further comprising at least one detergency additive.

* * * * *